US011907132B2

(12) United States Patent
Kohl et al.

(10) Patent No.: US 11,907,132 B2
(45) Date of Patent: Feb. 20, 2024

(54) FINAL CACHE DIRECTORY STATE INDICATION

(71) Applicant: International Business Machines Corporation, Armonk, NY (US)

(72) Inventors: Jason D Kohl, Austin, TX (US); Gregory William Alexander, Pflugerville, TX (US); Timothy Bronson, Round Rock, TX (US); Akash V. Giri, Austin, TX (US); Winston Herring, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/701,777

(22) Filed: Mar. 23, 2022

(65) Prior Publication Data
US 2023/0305966 A1    Sep. 28, 2023

(51) Int. Cl.
G06F 12/0895    (2016.01)

(52) U.S. Cl.
CPC .... G06F 12/0895 (2013.01); *G06F 2212/622* (2013.01)

(58) Field of Classification Search
CPC ............... G06F 12/0817; G06F 12/082; G06F 12/0822; G06F 12/0824; G06F 12/0826; G06F 12/0828; G06F 12/0895; G06F 12/0897; G06F 2212/62; G06F 2212/622
USPC ......................................................... 711/118
See application file for complete search history.

(56) References Cited

U.S. PATENT DOCUMENTS

| 7,085,898 | B2 | 8/2006 | Blake |
| 7,318,074 | B2 * | 1/2008 | Iyengar ............... G06F 16/9574 |
| | | | 707/999.203 |
| 8,250,308 | B2 | 8/2012 | Papazova |
| 10,248,325 | B2 | 4/2019 | Blankenship |

(Continued)

OTHER PUBLICATIONS

Daniel Lenoski, James Laudon, Kourosh Gharachorloo, Anoop Gupta, and John Hennessy. 1990. The directory-based cache coherence protocol for the DASH multiprocessor. SIGARCH Comput. Archit. News 18, 2SI (Jun. 1990), 148-159. https://doi.org/10.1145/325096.325132 (Year: 1990).*

(Continued)

*Primary Examiner* — Reginald G Bragdon
*Assistant Examiner* — Aaron D Ho
(74) *Attorney, Agent, or Firm* — Stephen R. Yoder; Jared L. Montanaro

(57) ABSTRACT

A method for managing designated authority status in a cache line includes identifying an initial designated authority (DA) member cache for a cache line, transferring DA status from the initial DA member cache to a new DA member cache, determining whether the new DA member cache is active, indicating a final state of the initial DA cache responsive to determining that the new DA member cache is active, and overriding a DA state in a cache control structure in a directory. A method for managing cache accesses during a designated authority transfer includes receiving a designated authority (DA) status transfer request, receiving an indication that a first cache will invalidate its copy of the cache line, allowing a second cache to assume DA status for the cache line, and denying access to the first cache's copy of the cache line until invalidation by the first cache is complete.

22 Claims, 6 Drawing Sheets

(56) References Cited

U.S. PATENT DOCUMENTS

| | | | |
|---|---|---|---|
| 10,248,591 B2 | 4/2019 | Safranek | |
| 10,360,168 B1 | 7/2019 | Griffin | |
| 2003/0093722 A1* | 5/2003 | Shanahan | G06F 12/0826 |
| | | | 711/E12.029 |
| 2009/0240889 A1* | 9/2009 | Choy | G06F 12/0815 |
| | | | 711/E12.024 |
| 2013/0254494 A1* | 9/2013 | Oxford | G06F 12/1466 |
| | | | 711/145 |
| 2016/0179674 A1* | 6/2016 | Sury | G06F 12/0822 |
| | | | 711/141 |
| 2019/0050332 A1* | 2/2019 | Alameldeen | G06F 12/0891 |
| 2022/0083473 A1* | 3/2022 | Sharma | G06F 12/0804 |

OTHER PUBLICATIONS

"Assumptions of Multiple Linear Regression", Statistics Solutions—Advancement Through Clarity, provided in search report dated Oct. 6, 2021, 5 pages, <http://www.statisticssolutions.com>.

"Detecting Uncached Areas of Memory to Augmenting a Cache Directory that Filters the Distribution of Snoop Commands", An IP.com Prior Art Database Technical Disclosure, Original Publication Date: Mar. 19, 2007, IP.com No. IPCOM000147544D, IP.com Electronic Publication Date: Mar. 19, 2007, 4 pages.

Authors et. al.: Disclosed Anonymously, "Method for maintaining a multi-level cache directory", An IP.com Prior Art Database Technical Disclosure, IP.com No. IPCOM000198061D, IP.com Electronic Publication Date: Jul. 24, 2010, 3 pages.

Chauhan, Naresh, "Principles of Operating Systems", Oxford University Press, First published in 2014, 698 pages.

Patterson et al., "Directory-based Cache Coherence Protocols", provided in search report dated Oct. 6, 2021, 9 pages.

Weil, Sage, "Reliable, Scalable, and High-Performance Distributed Storage: Distributed Metadata Management", An IP.com Prior Art Database Technical Disclosure, Original Publication Date: Feb. 19, 2014, IP.com No. IPCOM000234959D, IP.com Electronic Publication Date: Feb. 19, 2014, 10 pages.

* cited by examiner

FINAL CACHE DIRECTORY STATE INDICATION

BACKGROUND

The present invention relates generally to the field of cache management, and more specifically to indicating cache authority statuses.

In a general symmetric multiprocessing environment, it is common to have a multi-level cache hierarchy, with a private cache for each core at the lowest level(s), a combined cache serving multiple cores (and their corresponding lowest level caches) at the next level, a combined cache serving multiple lower level caches at the next level, and so on. Such a cache hierarchy would form a tree structure, with memory at the root of the tree, and each smaller cache branched from its parent cache, with the cores at the leaf nodes of the tree. In such a system, each cache may be inclusive of the lower level caches, or there may be a method of operating a distributed cache. In such a system, multiple member caches at any given level may have a copy of the same cache line, and one of the copies at a given level may have a Designation of Authority at that level to infer priority in certain situations. The Designated Authority (DA) may allow new operations to proceed, or may reject the continuance of a new operation. When a Designated Authority rejects a new operation, that operation must attempt again in order to complete. Re-attempting operations in this manner introduces delay to the system.

In some systems, there may be a mechanism for controlling the movement of the Designated Authority among participating caches at a given level. When an operation is in progress that is moving the Designated Authority, a new operation requesting permission from that Designated Authority may be allowed to proceed under certain circumstances. In other circumstances, the movement of the DA must be resolved before the next operation may be allowed to proceed. Typically, there is a handoff of the protection of the DA from the sender to the receiver. The sender will determine that the receiver has acknowledged the transfer of the DA, whether by the receiver providing an indication directly, another notification from another intermediary source, or by the sender's own deduction from coherency rules of the microarchitecture. Such protection includes indication to new operations that the DA exists in this cache, for the purposes of allowing new operations to proceed or rejecting new operations. For cache operations that transfer a DA wherein the sender retains a copy of the cache line without the DA transfer reflected, an internal operation must be performed in the sender's cache directory to indicate that this copy of the line no longer holds such authority. The completion of this internal update operation may not be bounded in time, and may incur delay if the cache is busy with other operations. For certain cache operations, it is necessary to invalidate a copy of a line in a cache, both when the copy of the line in this cache possessed the DA, and when the copy of the line in this cache did not possess the DA. This includes operations that transfer data, as well as operations that do not transfer data. In all cases, a cache must perform an internal operation on the directory to mark the line as invalid. The completion of this internal invalidation operation may not be bounded in time, and thus may incur delay if the cache is busy with other operations. In both of the above cases, where an update or invalidation of the cache directory is required, the operation of transferring the DA or invalidating the cache line is not considered complete until the update or invalidation of the cache directory is complete.

Generally, in a hierarchical cache system for multiple processors, the DA member cache may serve as an arbiter of who may access the line, and when the line may be accessed. It is generally advantageous to keep this DA in the member cache corresponding to the processor or lower (smaller/subsidiary) cache that has most recently requested the line. In a hierarchical cache system, there may be multiple levels of DA corresponding to each level of hierarchy. Therefore, when the DA grants a request for a line, it generally transfers the DA to the member cache who requested the line. During this transition, the former DA must protect the line by rejecting other requests for the line, until it can guarantee that the new DA has accepted ownership of the DA, and has begun to control access to the line. This guarantee may be in the form of a fixed upper-bound time to transfer, or an acknowledgement message, or other mechanism known in the art. Further, the former DA must update its own cache directory to indicate that it is no longer the DA, and that control has passed to its successor.

If the former DA incurs a delay in updating its own directory, it may continue to reject successive requests for the cache line, even though control of the line has been passed to the new DA, which has completed the incoming transfer and is willing to grant the line to a new request. Potential sources of delay include a busy cache directory, unavailable specialized hardware for processing requests such as controllers, or a surplus of higher-priority requests such as data delivery. The former DA delaying in updating its own directory may cause downstream delays to all future requests of the line, which must wait for the former DA to complete its directory update and cease further rejects. In general, latency is introduced to a system wherein a busy cache precludes status updates from occurring promptly.

Generally, when a fetch/invalidation/eviction is processed in a cache, a controller is used to facilitate the subsequent necessary steps (such as a directory read, cache read, directory invalidation, directory update, etc.). When a new request arrives, the address of the cache line being requested is compared to all other operations in progress in other controllers, which typically generates rejects when there are operations in progress for the same cache line.

SUMMARY

As disclosed herein, a computer implemented method for managing designated authority status in a cache line includes identifying an initial designated authority (DA) member cache for a cache line, transferring DA status from the initial DA member cache to a new DA member cache, determining whether the new DA member cache is active, indicating a final state of the initial DA cache responsive to determining that the new DA member cache is active, and overriding a DA state in a cache control structure in a directory. The method may additionally include receiving an indication that the new DA member cache has begun its protection of the cache line. The method may additionally include receiving an indication that the initial designated authority member cache will invalidate its copy of the cache line. The method may additionally include denying access to the initial DA member cache's copy of the cache line until the initial DA member cache invalidates its copy of the cache line. The method may further include determining that the initial DA member cache has invalidated its copy of the cache line and, responsive to said determination, allowing access to the initial DA member cache.

A computer program product for managing designated authority status in a cache line includes one or more computer readable storage media and program instructions stored on the one or more computer readable storage media, the program instructions comprising instructions for identifying an initial designated authority (DA) member cache for a cache line, transferring DA status from the initial DA member cache to a new DA member cache, determining whether the new DA member cache is active, indicating a final state of the initial DA cache responsive to determining that the new DA member cache is active, and overriding a DA state in a cache control structure in a directory. The computer program product may additionally include instructions for receiving an indication that the new DA member cache has begun its protection of the cache line. The computer program product may additionally include instructions for receiving an indication that the initial designated authority member cache will invalidate its copy of the cache line. The computer program product may additionally include instructions for denying access to the initial DA member cache's copy of the cache line until the initial DA member cache invalidates its copy of the cache line. The computer program product may further include instructions for determining that the initial DA member cache has invalidated its copy of the cache line and, responsive to said determination, allowing access to the initial DA member cache.

A computer system for managing designated authority status in a cache line includes one or more computer processors and one or more computer readable storage media and program instructions stored on the one or more computer readable storage media, the program instructions comprising instructions for identifying an initial designated authority (DA) member cache for a cache line, transferring DA status from the initial DA member cache to a new DA member cache, determining whether the new DA member cache is active, indicating a final state of the initial DA cache responsive to determining that the new DA member cache is active, and overriding a DA state in a cache control structure in a directory. The computer system may additionally include instructions for receiving an indication that the new DA member cache has begun its protection of the cache line. The computer system may additionally include instructions for receiving an indication that the initial designated authority member cache will invalidate its copy of the cache line. The computer system may additionally include instructions for denying access to the initial DA member cache's copy of the cache line until the initial DA member cache invalidates its copy of the cache line. The computer system may further include instructions for determining that the initial DA member cache has invalidated its copy of the cache line and, responsive to said determination, allowing access to the initial DA member cache.

A computer implemented method for managing cache accesses during a designated authority transfer includes receiving a designated authority (DA) status transfer request from a first cache to a second cache of a corresponding cache line, receiving an indication that the first cache will invalidate its copy of the cache line, allowing the second cache to assume DA status for the cache line, and denying access to the first cache's copy of the cache line until invalidation by the first cache is complete. The method may additionally include receiving an indication that the second cache has begun protection corresponding to its transferred DA status. The method may additionally include receiving an indication that the first cache has invalidated its copy of the cache line. The method may additionally include allowing access to the first cache's copy of the cache line responsive to receiving an indication that the first cache has invalidated its copy of the cache line. The method may additionally include rejecting requests to the second cache until an indication is received that the second cache has begun protection corresponding to its transferred DA status.

A computer program product for managing cache accesses during a designated authority transfer includes one or more computer readable storage media and program instructions stored on the one or more computer readable storage media, the program instructions comprising instructions for receiving a designated authority (DA) status transfer request from a first cache to a second cache of a corresponding cache line, receiving an indication that the first cache will invalidate its copy of the cache line, allowing the second cache to assume DA status for the cache line, and denying access to the first cache's copy of the cache line until invalidation by the first cache is complete. The computer program product may additionally include instructions for receiving an indication that the second cache has begun protection corresponding to its transferred DA status. The computer program product may additionally include instructions for receiving an indication that the first cache has invalidated its copy of the cache line. The computer program product may additionally include instructions for allowing access to the first cache's copy of the cache line responsive to receiving an indication that the first cache has invalidated its copy of the cache line. The computer program product may additionally include instructions for rejecting requests to the second cache until an indication is received that the second cache has begun protection corresponding to its transferred DA status.

Various embodiments of the present invention include a protocol for a former DA transferring DA status away from itself to indicate its final directory state before it has completed a directory update to move to that final state. When the former DA has determined that the new DA has begun its own protection of the line, whether it is only rejecting until it is ready or it is also choosing to grant new requests, the former DA indicates its final state. At such a point, the former DA ceases to protect the line at levels above its final DA state. The former DA indicates its final state in the cache control structure, overriding the DA state in the directory. In the current state of the art, there may not be an upper bound on the amount of time required to complete a directory update. Various embodiments of the present invention leveraging a fixed-time transfer window from the former DA granting to the next DA assuming responsibility advantageously lead to a bounded time to complete each transfer of coherency and for the former DA to cease further rejects. Various embodiments of the present invention leveraging a return message from the new DA to the former DA indicating receipt advantageously lead to a semi-bounded time, which is effectively bounded after the transfer of DA status, which is required to proceed to the subsequent transfer regardless.

Various embodiments of the present invention enable faster data delivery and coherency to subsequent requestors despite directory update slowdowns in individual caches. Further, various embodiments of the present invention allow future exclusive requests to guarantee invalidation of all copies of the line, and proceed, even while former copies are still in the process of invalidation. In various embodiments wherein a controller calculates what the level of authority and validity will be at completion and the response generation hardware ignores the directory state and instead indicates the final state on the response, next requests are allowed to progress even when there is a delay updating the directory for a previous request.

DETAILED DESCRIPTION

When a cache will not transfer data, and will not transfer a Designated Authority to another cache, and will invalidate its copy of a cache line, it may indicate that it will complete such invalidation before it has actually completed the invalidation (provided that it ensures that its copy of the cache line may no longer be accessed after the time at which it indicates that the validation will complete). In the event that the cache is delayed in actually completing the invalidation, a subsequent operation may query the cache to determine the status of the cache line. If the cache indicates that it has not yet completed the invalidation, the subsequent operation must wait until the invalidation is complete to proceed. If the cache indicates that it will complete the invalidation without allowing any other access to the line, the subsequent operation may proceed as though the invalidation for the former operation has already completed.

When a cache will either transfer data or transfer a Designated Authority to another cache, and will invalidate its copy of a cache line, it may indicate that it will complete such invalidation before it has actually completed the invalidation, provided that it both ensures that its copy of the cache line may no longer be accessed after the time at which it indicates that the invalidation will complete and ensures that the receiver of the Designated Authority has acknowledged the transfer of the DA, and has also begun protection corresponding to its newly acquired DA.

When a cache will transfer a Designated Authority to another cache and will not invalidate its copy of a cache line (and therefore will update the directory entry for the cache line), it may indicate that it will complete such an update before it has actually completed the update, provided that it ensures that the receiver of the DA has acknowledged the transfer of the DA and has subsequently begun its protection corresponding to the newly acquired DA. In the event that such a cache is delayed in actually completing the directory update, a subsequent operation may query the cache to determine the status of the cache line. If the cache indicates that the cache is still in possession of the DA, it may result in a reject of the subsequent operation, and the subsequent operation may be delayed by being forced to retry before it can complete. If the cache indicates that it will complete the directory update and indicates what its final directory state will be following the update, the subsequent operation may proceed as though the update for the former operation has already completed. By providing a mechanism for the sending or invalidating cache to indicate its final directory state before it has completed the directory update or invalidation, delays in the sending cache may be limited to that cache, and subsequent operations can proceed sooner than if they were required to wait for the sending cache to complete.

Figure 1:
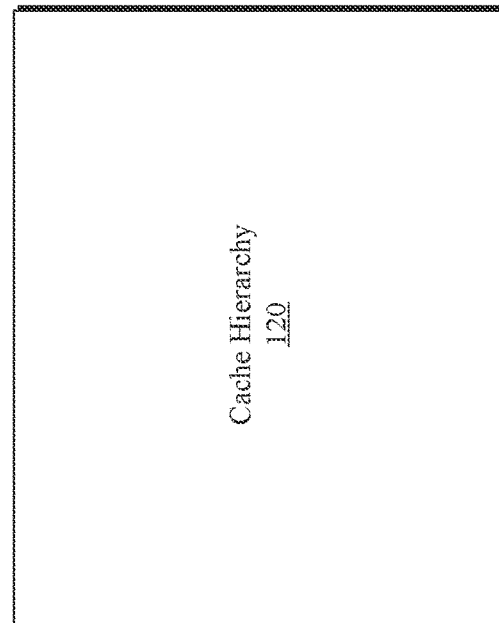
FIG. 1 is a block diagram depicting a cache management system in accordance with at least one embodiment of the present invention.
Figure 1:
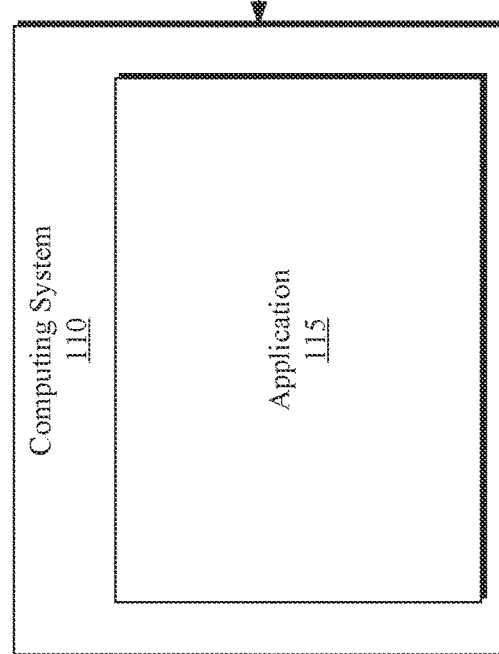

FIG. 1 is a block diagram depicting a cache management system 100 in accordance with at least one embodiment of the present invention. As depicted, cache management system 100 includes computing system 110 and cache hierarchy 120. Computing system can be a desktop computer, a laptop computer, a specialized computer server, or any other computer system known in the art. In some embodiments, computing system 110 represents a computer system utilizing clustered computers to act as a single pool of seamless resources. In general, computing system 110 is representative of any electronic device, or combination of electronic devices, capable of receiving and transmitting data, as described in greater detail with regard to FIG. 6. Computing system 110 may include internal and external hardware components, as depicted, and described in further detail with respect to FIG. 6.

As depicted, computing system 110 includes application 115. Application 115 may be configured to execute a cache management method, such as cache management method 200 described with respect to FIG. 2. In general, application 115 is configured to monitor and manage cache hierarchy 120. Cache hierarchy 120 can be a memory architecture using a hierarchy of memory stores based on varying access speeds to cache data. In at least some embodiments, cache hierarchy 120 caches highly requested data in high-speed access memory stores, allowing swifter access by CPU cores. While the depicted embodiment depicts cache hierarchy 120 as a standalone body, it should be appreciated that in some embodiments, cache hierarchy 120 may exist on computing system 110 alongside application 115.

Figure 2:
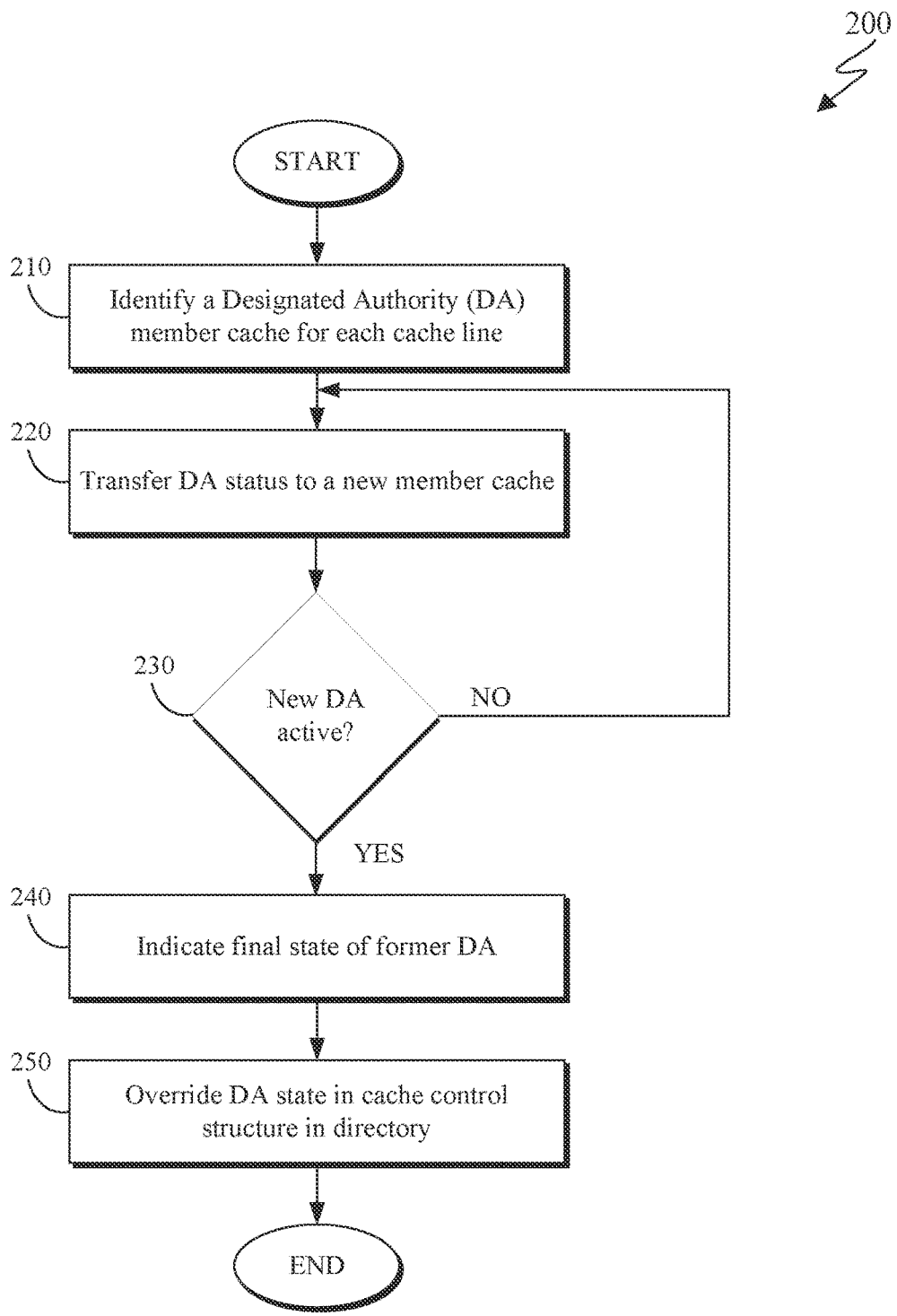
FIG. 2 is a flowchart depicting a cache management method in accordance with at least one embodiment of the present invention.

FIG. 2 is a flowchart depicting a cache management method 200 in accordance with at least one embodiment of the present invention. As depicted, cache management method 200 includes identifying (210) a DA member cache for a cache line, transferring (220) DA status to a new member cache, determining (230) whether the new DA cache is active, indicating (240) a final state of the former DA cache, and overriding (250) the DA state in the cache control structure in the directory. Cache management method 200 may enable faster data delivery and coherency to subsequent requestors despite directory update slowdowns in individual caches.

Identifying (210) a DA member cache for a cache line may include selecting a cache line for analysis and manipulation. In at least some embodiments, the selected cache line may be a cache line exhibiting performance deficiencies; in other embodiments, such as embodiments wherein a set of cache lines are being managed, the selected cache line may simply correspond to a next cache line. Identifying (210) a DA member cache may include analyzing the caches in the cache line to identify a currently acting DA member cache. In some embodiments, identifying (210) a DA member cache includes querying a directory corresponding to the cache line for a cache control structure. Generally, identifying (210) a DA member cache for a cache line includes identifying a member cache currently responsible for responding to requests for the cache line.

Transferring (220) DA status to a new member cache may include receiving an instruction to transfer DA status away from the current member cache and onto a different member cache. Transferring (220) DA status to a new member cache may include receiving an indication of which member cache should subsequently receive DA status; in other embodiments, the received instruction may simply request that DA status be granted to a cache other than the current DA. In at least some embodiments, transferring (220) DA status to a new member cache includes transferring DA status to a member cache which has most recently requested the line. Transferring (220) DA status to a new member cache may occur responsive to a request or instruction to transfer the DA status to the new member cache. In other embodiments, such as embodiments wherein protocol dictates that DA status is applied to a member cache which has most recently requested the line, transferring (220) DA status to a new member cache occurs automatically responsive to a determination that the cache which most recently requested the line is not the DA. In general, transferring (220) DA status to a new member cache includes communicating to the current DA cache that it no longer has DA status, as well as communicating to the new member cache that it has been granted DA status for the cache line.

Determining (230) whether the new DA cache is active may include determining whether the new DA cache has begun responding to requests corresponding to the cache line for which it is now DA. In at least some embodiments, the new DA cache may strictly reject requests to the cache line until it is "ready" to fulfill the DA obligation; in such embodiments, determining (230) whether the new DA cache is active may include determining whether the new DA cache is rejecting requests. In other embodiments, such as those wherein the DA cache is not configured to reject requests by default until it is "ready", determining (230) whether the new DA cache is active may include determining whether the new DA cache is actively granting or rejecting new requests. In at least some embodiments, determining (230) whether the new DA cache is active includes issuing a test request to test whether the new DA cache is yet acting in its DA capacity, such that the reply to the test request will come from the new DA cache if it is indeed acting as DA. In general, determining (230) whether the new DA cache is active includes confirming that the new DA cache has taken over DA responsibilities for the line.

If it is determined that the new DA cache is active (230, yes branch), the method continues by indicating (240) a final state of the former DA cache. If it is determined that the new DA cache is not active (230, no branch), the method continues by returning to transferring (220) DA status to a new member cache. It should be appreciated that in some embodiments, returning to transferring (220) DA status to a new member cache may include simply rearticulating the request/indication which initially commenced the DA status change proceedings; in other words, returning to transferring (220) DA status to a new member cache does not necessarily mean transferring status to a different member cache from the initial request, but may rather include re-transmitting the request. In other embodiments, returning to transferring (220) DA status to a new member cache may include again transferring the DA status to a different new member cache. In at least some embodiments, there exists no additional message or re-transmission between the former DA and the new DA.

Indicating (240) a final state of the former DA cache may include updating the status of the former DA cache to reflect that it no longer has DA status for the cache line. In at least some embodiments, indicating (240) a final state of the former DA cache includes ceasing responses to requests on behalf of the former DA cache. Generally, indicating (240) a final state of the former DA cache occurs responsive to determining that the new DA cache is indeed active, and therefore the cache line no longer requires protection from the previous DA cache. Notably, indicating (240) a final state of the former DA cache occurs on the basis of the presence of a new DA cache, and does not rely on any updates to the directory or the cache control structure.

Overriding (250) the DA state in the cache control structure in the directory may include communicating with the directory to amend the cache control structure to include the updated DA status. In other words, overriding (250) the DA state in the cache control structure includes updating the cache control structure to reflect that the former DA cache no longer has DA status, and that the new member cache has been given DA status. In general, overriding (250) the DA state in the directory includes updating any organization structure which reflects the configuration of the cache line.

Figure 3:
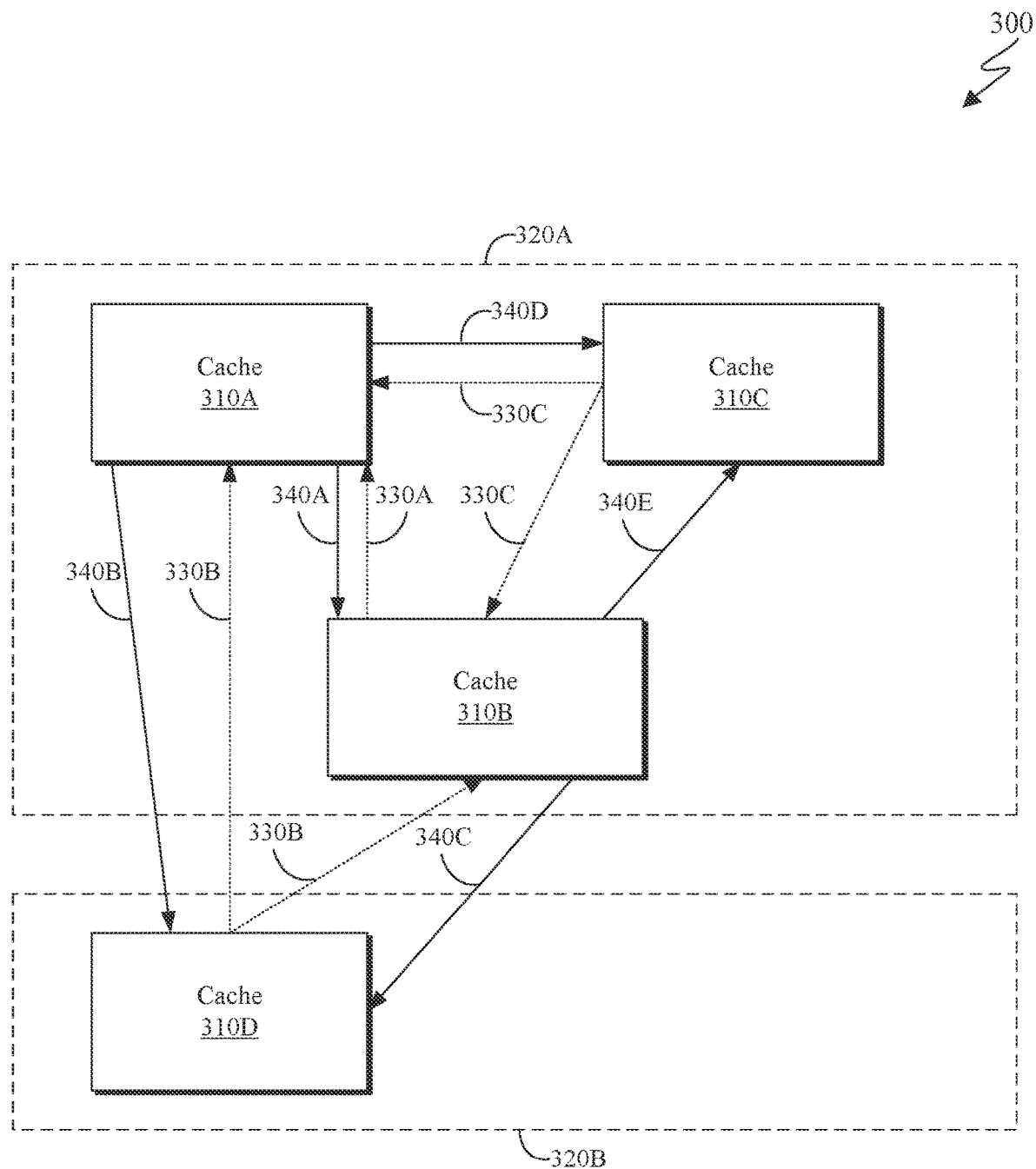
FIG. 3 is a block diagram depicting a cache hierarchy in accordance with at least one embodiment of the present invention.

FIG. 3 is a block diagram depicting a cache hierarchy 300 in accordance with at least one embodiment of the present invention. As depicted, cache hierarchy 300 includes cache 310A, cache 310B, cache 310C, and cache 310D (sometimes collectively referred to as caches 310), and scope level 320A and scope level 320B (sometimes collectively referred to as scope levels 320). Additionally depicted are requests and responses between the components of cache hierarchy 300, including fetch 330A, fetch 330B, and fetch 330C (sometimes collectively referred to as fetches 330), and response 340A, response 340B, response 340C, response 340D, and response 340E (sometimes collectively referred to as responses 340). With respect to the depicted embodiment, scope level 320A and scope level 320B are both scope level 1 over separate domains. It should be appreciated that in a separate (not depicted) embodiment, scope level 2 would surround all elements of FIG. 3, such that both scope levels 320 would be subsidiaries. There may exist a level-1 DA that controls movement of the cache line within 320B, but which has no jurisdiction in 320A. Similarly, there may be a level-2 DA which controls movement of the cache line across the level-2 scope (in other words, the entire cache hierarchy 300).

In a multi-level cache hierarchy, consider an invalid cache directory entry to be a lowest state (0), a directory entry containing a valid line with authority over the lowest level of hierarchy to be the next lowest state (1), a directory entry containing a valid line with authority over the second-lowest level of hierarchy (2), and so on. For example, if the destination of the DA is inside the second-level hierarchy but outside the first-level hierarchy, the second-level DA will move as a result of granting the request, but the first-level DA will remain in place. The DA will indicate that its final state is 1 (authority over the lowest level of hierarchy). When a fetch/invalidation/eviction is processed in a cache, a controller is used to facilitate the steps it must make (such as a directory read, cache read, directory invalidation, directory update, etc.). When a new request arrives, the address of the cache line being requested is compared to all other operations in progress in other controllers, in the central address compare logic. Typically, this comparison generates rejections when there are operations in progress for the same cache line. In some embodiments, controllers indicate a final state via pending signals to the central address compare logic. This indication can be to retain authority level (use the directory state to reject with its level of authority), demote to lower authority level (block the directory state, and reject with an indicated level of authority), or invalidate (block the directory state, and indicate a miss for that line in this cache).

Consider two scenarios with respect to cache hierarchy 300: a first in the absence of embodiments of the present invention, and a second with an embodiment of the invention implemented. In the absence of an implementation of embodiments of the present invention, cache 310A begins as DA=2. After cache 310B initiates a first fetch 330A, cache 310A grants DA=2 to cache 310B and also provides the requested data to cache 310B via response 340A. However, in situations where the directory in cache 310A is busy at the time of response 340A, the directory is not updated to reflect the transfer of DA status. Cache 310D initiates a second fetch 330B to cache 310A, and cache 310A provides a response 340B rejecting the request. The second fetch 330B may be rerouted through cache 310B, which issues a response 340C granting DA=2 to cache 310D and providing requested data. Once cache 310B is done servicing fetch 330B, cache 310B demotes to DA=1. Cache 310C initiates a third fetch 330C to cache 310A and cache 310B. Cache 310B (currently DA=1 per the directory) issues a response 340E granting the request, but cache 310A (currently DA=2 per directory, as the directory hasn't been updated due to its busy status) issues a response 340D rejecting the request which overrules cache 310B's grant. Accordingly, cache 310C's request is rejected, and must wait to be granted until the directory is updated to reflect cache 310A's diminished DA status. In other words, the fetch is stuck.

In the presence of an implementation of embodiments of the present invention, cache 310A begins as DA=2. After cache 310B initiates a first fetch 330A, cache 310A grants DA=2 to cache 310B, and also provides requested data to cache 310B via response 340A. Subsequently, cache 310A claims DA=0 after fetch 330A, and cache 310B claims DA=2. Cache 310D initiates a second fetch 330B to both cache 310A and 310B. Cache 310A ignores the second fetch 330B (via response 340B) as cache 310A is no longer acting DA. Cache 310B grants DA=2 status to requesting cache 310D, and also provides requested data to cache 310D via response 340C. Responsive to giving away DA=2 status, cache 310B is demoted to DA=1. Cache 310C initiates a third fetch request 330C to cache 310A and cache 310B. Cache 310A, still maintaining a DA status of DA=0, ignores the request (response 340D). Cache 310B, currently maintaining the highest DA status (DA=1) at scope level 320A, grants DA status DA=1 to cache 310C responsive to fetch 330C, and also provides requested data to cache 310C via response (340E).

Figure 4:
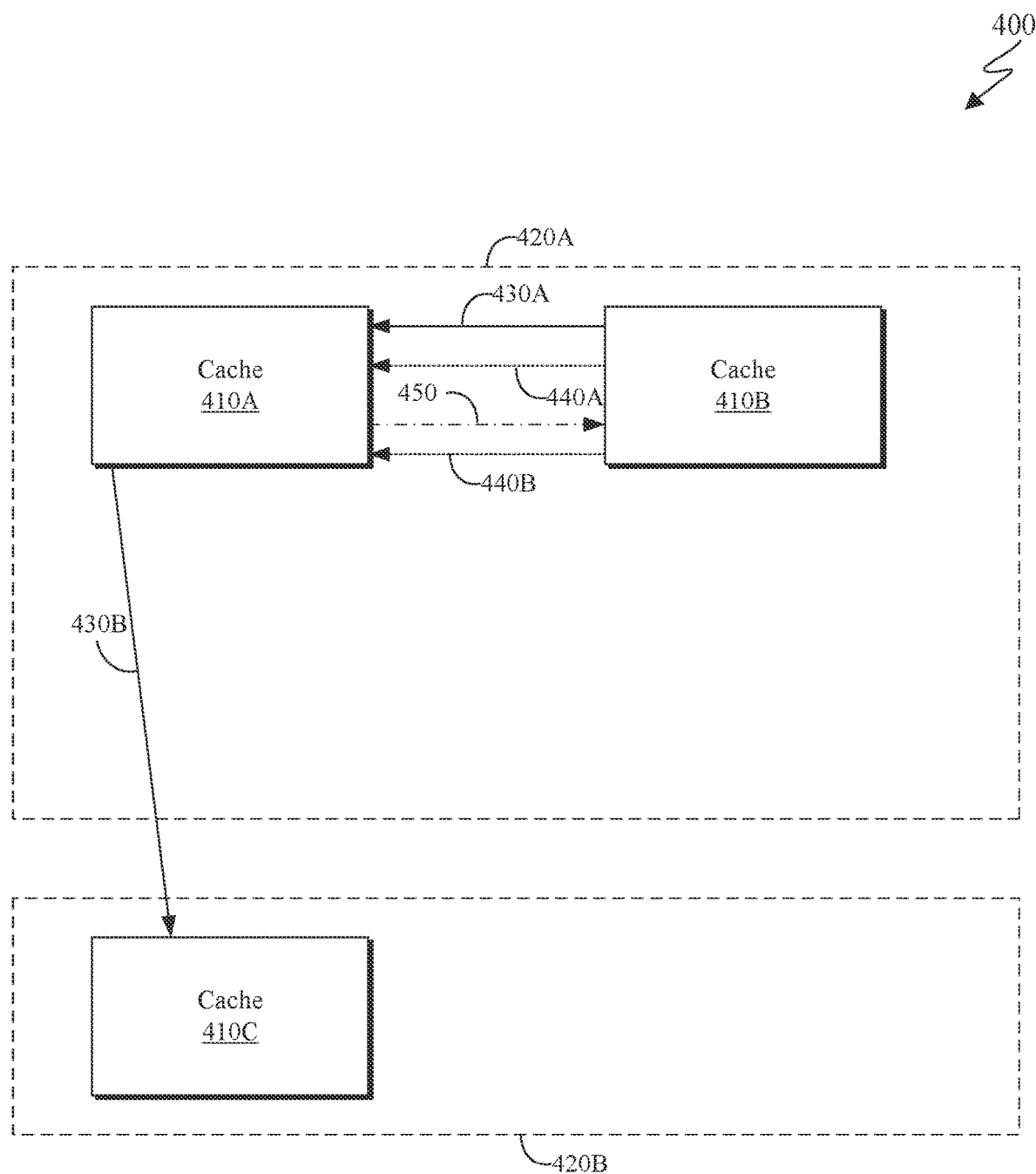
FIG. 4 is a block diagram depicting a cache hierarchy in accordance with at least one embodiment of the present invention.

FIG. 4 is a block diagram depicting a cache hierarchy 400 in accordance with at least one embodiment of the present invention. As depicted, cache hierarchy 400 includes cache 410A, cache 410B, and cache 410C (sometimes collectively referred to as caches 410), and scope level 420A and scope level 420B (sometimes collectively referred to as scope levels 420). Additionally depicted are requests and responses between the components of cache hierarchy 400, including castout 430A and castout 430B (sometimes collectively referred to as castouts 430), fetch 440A and fetch 440B (sometimes collectively referred to as fetches 440), and response 450.

Cache hierarchy 400 depicts a cache hierarchy exhibiting fetch delays. Cache 410B initiates a castout 430A of DA=2 within scope level 420A. Cache 410A receives castout 430A and accepts DA=2 from cache 410B. Subsequently, cache 410A initiates a castout 430B of DA=2 outside of scope level 420A. In situations where the directory is busy at the time of castout 430B, the directory in cache 410A may not be updated to reflect the transfer of DA status; assume this is one of those instances. Cache 410C accepts castout 430B, and installs DA=2. Cache 410B then initiates fetch 440A to request DA=2 status from cache 410A. Cache 410A issues a response 450 rejecting fetch 440A, notably because the directory of cache 410A still maintains DA=2 status. Due to the reject response 450, cache 410B may not know to or may not be allowed to initiate a fetch request outside scope 420A to cache 410C, and therefore may initiate additional fetch requests (such as fetch request 440B) again to cache 410A. Cache 410A will continue to reject these fetch requests until the directory is updated and cache 410B can properly direct its requests, and therefore the fetch will be stuck in the interim.

Figure 5:
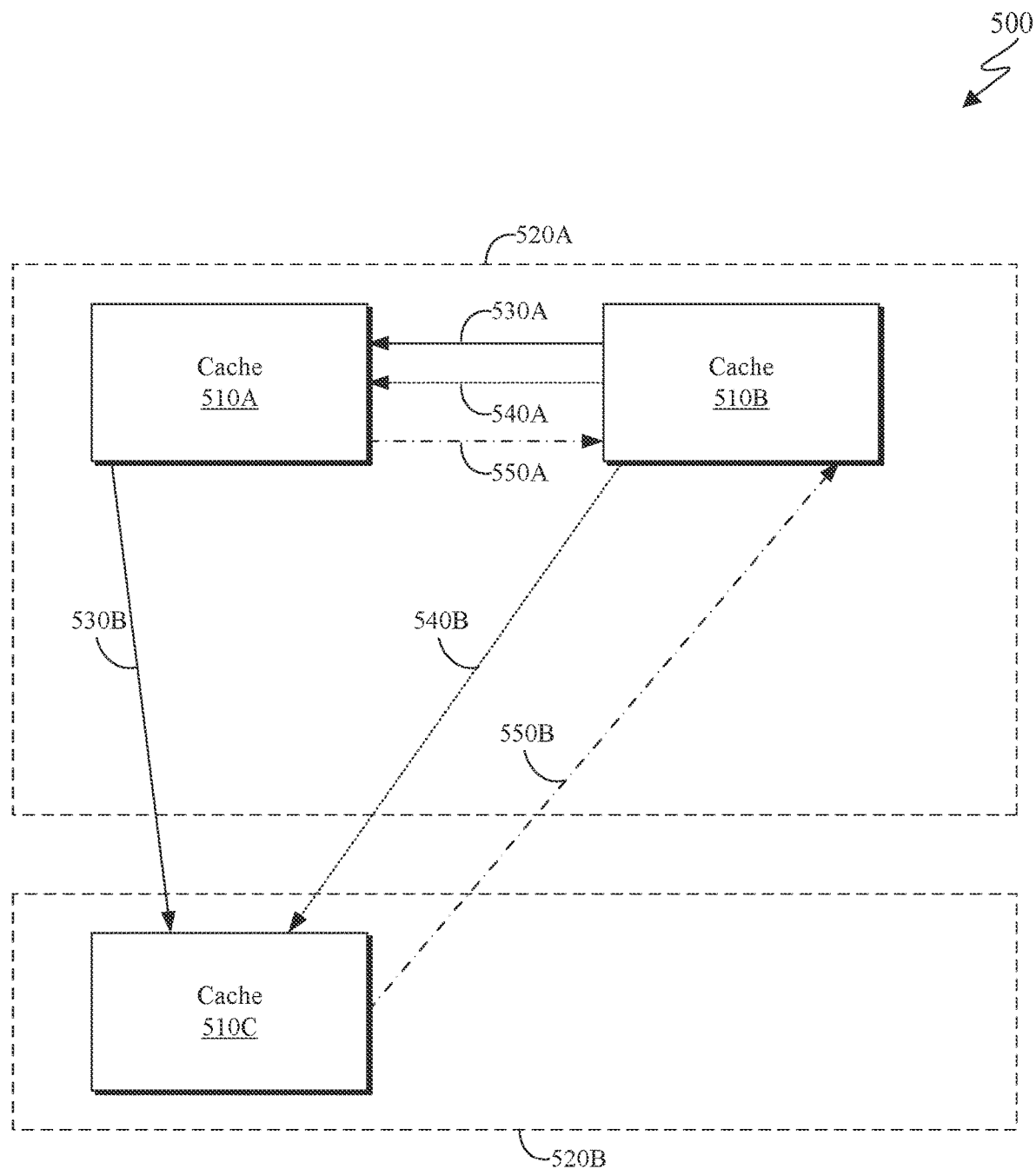
FIG. 5 is a block diagram depicting a cache hierarchy in accordance with at least one embodiment of the present invention.

FIG. 5 is a block diagram depicting a cache hierarchy 500 in accordance with an embodiment of the present invention. As depicted, cache hierarchy 500 includes cache 510A, cache 510B, and cache 510C (sometimes collectively referred to as caches 510), and scope level 520A and scope level 520B (sometimes collectively referred to as scope levels 520). Additionally depicted are requests and responses between the components of cache hierarchy 500, including castout 530A and castout 530B (sometimes collectively referred to as castouts 530), fetch 540A and fetch 540B (sometimes collectively referred to as fetches 540), and response 550A and response 550B (sometimes collectively referred to as responses 550).

Cache 510B initiates a castout 530A of DA=2 within scope level 520A. Cache 510A receives castout 530A and accepts DA=2 from cache 510B. Subsequently, cache 510A initiates a castout 530B of DA=2 outside of scope level 520A to cache 510C in scope level 520B. Once cache 510A initiates castout 530B, cache 510A also creates an indication stating that invalidation of outdated cache hierarchies indicating cache 510A as DA=2 is in progress. Cache 510C accepts castout 530B from cache 510A, and installs DA=2. Cache 510B then initiates fetch 540A to request DA=2 status from cache 510A. Cache 510A issues a response 550A to cache 510B indicating a cache miss; in other words, the cache line being requested was not found in the directory. With respect to response 550A, although the cache line is a hit in the directory, cache 510A is preemptively indicating its final directory state (which will be miss, when in-progress castout operation 530B completes). This allows fetch 540A to receive response 550A that indicates "miss", which allows fetch 540A to proceed with another fetch at a higher scope (resulting in fetch 540B). If the "miss" response on 550A were not allowed, response 550A would have to indicate "reject", and cache 510B would have to retry fetch 540A until such a time that castout 530B could regularly indicate "miss" due to the line having been invalidated from the directory of 510A by that time. Response 550A may include the previously generated indication that cache hierarchies listing cache 510A as DA=2 are in the process of being invalidated, thereby alerting cache 510B that it is requesting from a cache that cannot grant the request at this time, but which also does not block the operation from requesting again or from being granted by another cache. Cache 510B then initiates fetch 540B to request DA=2 status from cache 510C. Cache 510C issues a response 550B to cache 510B including a grant of DA=2 and corresponding data. By indicating the pending invalidation of cache 510A's DA=2 status, cache 510B is able to initiate an appropriate request without being forced to wait until the invalidation is complete.

Figure 6:
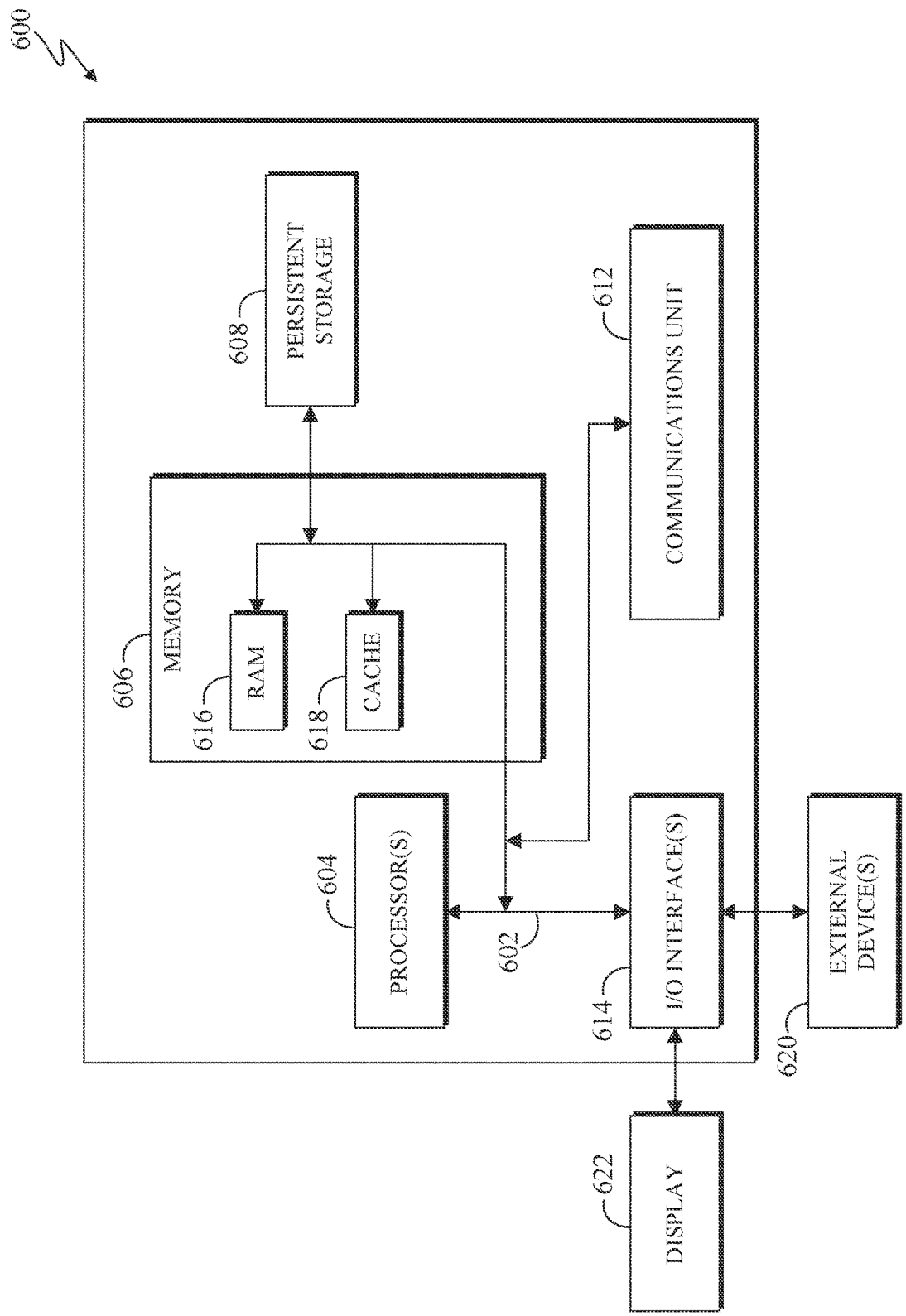
FIG. 6 is a block diagram of components of a computing system in accordance with an embodiment of the present invention.

FIG. 6 depicts a block diagram of components of computing system 105 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
    identifying an initial designated authority (DA) member cache for a cache line, the initial DA member cache having a DA status;
    transferring the DA status from the initial DA member cache to a new DA member cache;
    receiving an operation request;
    indicating that the initial DA member cache will be invalidated without allowing any other access to the cache line prior to invalidation; and
    allowing the operation request to proceed as though the initial DA member cache has been invalidated prior to invalidation of the initial DA member cache.

2. The computer implemented method of claim 1, further comprising receiving an indication that the new DA member cache has begun its protection of the cache line.

3. The computer implemented method of claim 1, further comprising denying access to the initial DA member cache's copy of the cache line until the initial DA member cache invalidates its copy of the cache line.

4. The computer implemented method of claim 3, further comprising:
    determining that the initial DA member cache has invalidated its copy of the cache line; and
    responsive to determining that the initial DA member cache has invalidated its copy of the cache line, allowing access to the initial DA member cache.

5. A computer program product comprising:
    one or more computer readable storage media and program instructions stored on the one or more computer readable storage media, the program instructions comprising instructions to:
    identify an initial designated authority (DA) member cache for a cache line, the initial DA member cache having a DA status;
    transfer the DA status from the initial DA member cache to a new DA member cache;
    receive an operation request;
    indicate that the initial DA member cache will be invalidated without allowing any other access to the cache line prior to invalidation; and
    allow the operation request to proceed as though the initial DA member cache has been invalidated prior to invalidation of the initial DA member cache.

6. The computer program product of claim 5, the program instructions further comprising instructions to receive an indication that the new DA member cache has begun its protection of the cache line.

7. The computer program product of claim 5, the program instructions further comprising instructions to deny access to the initial DA member cache's copy of the cache line until the initial DA member cache invalidates its copy of the cache line.

8. The computer program product of claim 7, the program instructions further comprising instructions to:
    determine that the initial DA member cache has invalidated its copy of the cache line; and responsive to determining that the initial DA member cache has invalidated its copy of the cache line, allow access to the initial DA member cache.

9. A computer system comprising:
one or more computer processors;
one or more computer-readable storage media; and
program instructions stored on the computer-readable storage media for execution by at least one of the one or more processors, the program instructions comprising instructions to:
  identify an initial designated authority (DA) member cache for a cache line, the initial DA member cache having a DA status;
  transfer the DA status from the initial DA member cache to a new DA member cache;
  receive an operation request;
    indicate that the initial DA member cache will be invalidated without allowing any other access to the cache line prior to invalidation; and
  allow the operation request to proceed as though the initial DA member cache has been invalidated prior to invalidation of the initial DA member cache.

10. The computer system of claim 9, the program instructions further comprising instructions to receive an indication that the new DA member cache has begun its protection of the cache line.

11. The computer system of claim 9, the program instructions further comprising instructions to deny access to the initial DA member cache's copy of the cache line until the initial DA member cache invalidates its copy of the cache line.

12. The computer system of claim 11, the program instructions further comprising instructions to:
  determine that the initial DA member cache has invalidated its copy of the cache line; and
  responsive to determining that the initial DA member cache has invalidated its copy of the cache line, allow access to the initial DA member cache.

13. A computer implemented method comprising:
  receiving a designated authority (DA) status transfer request from a first cache to a second cache of a corresponding cache line;
  receiving an indication that the first cache will invalidate a respective copy of the cache line without allowing any other access to the respective copy of the cache line prior to invalidation;
  responsive to the received indication, allowing the second cache to assume a DA status for the corresponding cache line prior to the first cache invalidating the respective copy of the cache line; and
  denying access to the respective copy of the cache line until invalidation by the first cache is complete.

14. The computer implemented method of claim 13, further comprising:
  transferring the DA status for the cache line to the second cache; and
  receiving an indication that the second cache has begun protection corresponding to the transferred DA status.

15. The computer implemented method of claim 13, further comprising receiving an indication that the first cache has invalidated its copy of the cache line.

16. The computer implemented method of claim 15, further comprising:
  responsive to receiving an indication that the first cache has invalidated its copy of the cache line, allowing access to the first cache's copy of the cache line.

17. The computer implemented method of claim 13, further comprising rejecting requests to the second cache until an indication is received that the second cache has begun protection corresponding to its transferred DA status.

18. A computer program product comprising:
one or more computer readable storage media and program instructions stored on the one or more computer readable storage media, the program instructions comprising instructions to:
  receive a designated authority (DA) status transfer request from a first cache to a second cache of a corresponding cache line;
  receive an indication that the first cache will invalidate a respective copy of the cache line without allowing any other access to the respective copy of the cache line prior to invalidation;
  responsive to the received indication, allow the second cache to assume a DA status for the corresponding cache line prior to the first cache invalidating the respective copy of the cache line; and
  deny access to the respective copy of the cache line until invalidation by the first cache is complete.

19. The computer program product of claim 18, the program instructions further comprising:
  instructions to transfer the DA status for the cache line to the second cache; and
  instructions to receive an indication that the second cache has begun protection corresponding to the transferred DA status.

20. The computer program product of claim 18, the program instructions further comprising instructions to receive an indication that the first cache has invalidated its copy of the cache line.

21. The computer program product of claim 18, the program instructions further comprising instructions to:
  responsive to receiving an indication that the first cache has invalidated its copy of the cache line, allow access to the first cache's copy of the cache line.

22. The computer program product of claim 18, the program instructions further comprising instructions to reject requests to the second cache until an indication is received that the second cache has begun protection corresponding to its transferred DA status.

* * * * *